Jan. 24, 1956  H. BRETTHAUER  2,732,236
LATCH FOR PHOTOGRAPHIC CAMERAS
Filed June 19, 1952  2 Sheets-Sheet 1

Jan. 24, 1956  H. BRETTHAUER  2,732,236
LATCH FOR PHOTOGRAPHIC CAMERAS
Filed June 19, 1952  2 Sheets-Sheet 2

United States Patent Office 2,732,236
Patented Jan. 24, 1956

2,732,236

LATCH FOR PHOTOGRAPHIC CAMERAS

Hermann Bretthauer, Braunschweig, Germany, assignor to Franke & Heidecke, Fabrik Photographischer Prazisions-Apparate, Braunschweig, Germany, a firm Application June 19, 1952, Serial No. 294,385

Claims priority, application Germany June 20, 1951

7 Claims. (Cl. 292—65)

The present invention relates to photography, and more particularly to photographic cameras of the type in which a box like body is provided with a displaceable back which has a generally L shape so that it closes not only the rear of the camera body but also constitutes the bottom wall thereof because of a rigid lower forward extension on the back that meets and seals with the front camera wall. Such backs are commonly provided in connection with reflex focusing and viewfinding cameras in which the viewfinder is arranged above the main dark chamber and built into the common rigid housing body. The back is usually hinged at the top to the rear of the camera, and the forwardly projecting bottom portion thereof and the front camera wall are provided with a latch or similar securing device to make an assembled light tight fit.

It is also the practice with such cameras to provide not only displaceable back elements but a removable back in which one type may be substituted for another according to, for instance, whether the camera is to be equipped with film or plate adapter service.

Still referring to the releasable latching catch between the said bottom portion of the back and the front wall, it is difficult, in the original manufacture, to make these cooperating parts interchangeably uniform so that such securing means will fit precisely and not require further adjustment by the amateur user in each case.

It is the broad object of the present invention to provide, in such instances, a simple, efficient, compact and convenient latching device interacting between the back element and the catch pin on the camera front that will have the capability of adapting itself within a reasonable range of irregularity to slight misfitting of the parts and inevitably attain a tight and secure latching connection.

A further object of the invention is to attain this result by providing means on the movable element of the latch that will provide for a certain amount of lost motion between the engaging parts, whereby, in the locking actuation, the ultimate engagement will be strongly resilient.

These and other desirable objects may be attained in the manner disclosed as an illustrative embodiment of the invention in the following description and in the accompanying drawings forming a part hereof, in which.

The same reference numerals throughout the several views indicate the same parts.

Figure 1:
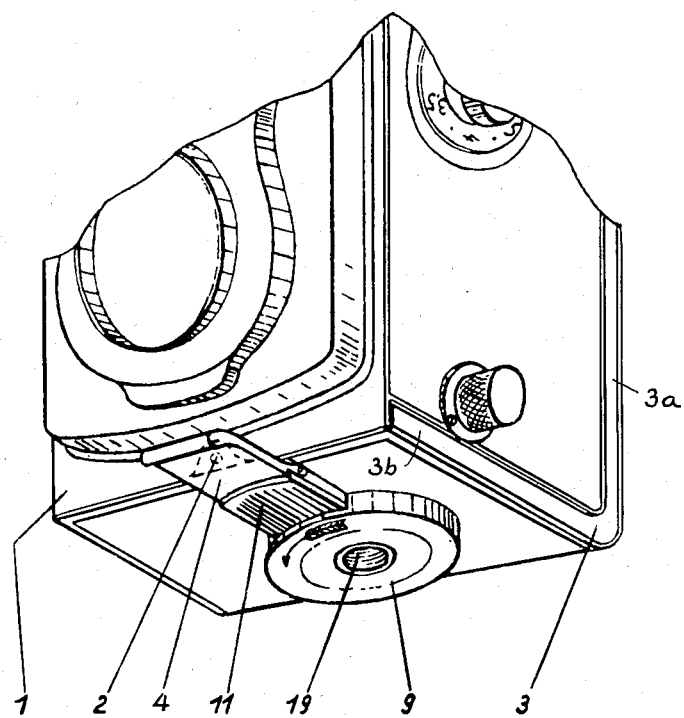
Fig. 1 is a bottom perspective view of a camera body, partly broken away, and a similar view of the latch mechanism applied thereto.
Figure 2:
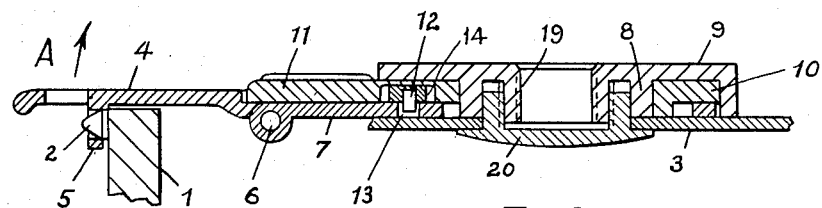
Fig. 2 is a somewhat enlarged central vertical section taken from front to rear through the latch mechanism inverted, relatively to Fig. 1, to the position it would assume when the camera is inverted to apply and secure the combination back and bottom closure elements, the latch being in engaged position.
Figure 3:
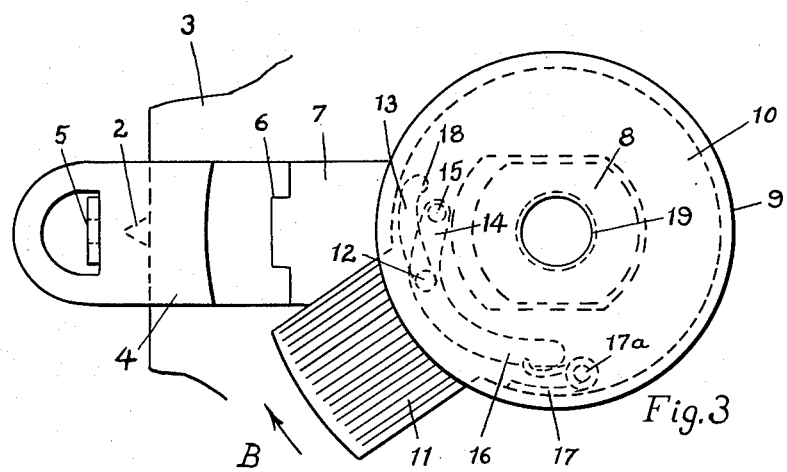
Fig. 3 is a plan view with the latch in disengaged position.

Referring more particularly to the drawings and first to Fig. 1 thereof, 1 indicates the front of a camera body of the type referred to and 3 the L-shaped, displaceable back, comprising, in one rigid piece, the vertical primary back closure 3$^a$, and the horizontal bottom closure 3$^b$ abutting the front 1. Carried on the under side of the part 3$^b$ is a mounting including a circular housing plate 9 having parts which control the latching mechanism for latching the camera back 3 to the front wall 1. The front wall 1 has a tapered or conical pin 2 adapted to be received in a hole in an angular ear 5 on the latch or clasp member 4 which is pivoted at 6 to the slide member 7. The plate 9 and its hollow stud 8 are suitably secured to the wall portion 3$^b$ of the camera back 3, as by means of a screw 20. The stud 8 is flattened at two opposite sides, and the slide member 7 encircles the stud 8 by means of an elongated slot in the slide 7 which embraces snugly but slidably against the flattened sides of the stud 8, while allowing the slide to move through a limited range of travel relative to the stud, without turning on the stud. When the slide 7 is moved to the left (when viewed as in Figs. 2 and 3) relative to the stud 8, the ear 5 is disengaged from the pin 2. When the slide 7 is moved to the right, the ear 5 engages the pin 2, as seen in Fig. 2.

For moving the slide 7 to engage and disengage the pin 2, there is provided on the stud 8, beneath the plate 9, a rotatable disk 10 having a radial handle 11 by which the disk may be rotated through part of a revolution. This disk 10 (when the camera is in the inverted position corresponding to Figs. 2 and 3) underlies the plate 9 and overlies the slide 7. The disk is provided with a pin 12 which projects downwardly into a cam groove 13 formed in the slide 7, which cam groove is shaped somewhat spirally in such way that when the disk 10 is turned to the counterclockwise limit of its motion, as in Fig. 3, the pin 12 lies at one end of the cam slot 13 and the slide 7 is at the leftward limit of its travel, where the pin 2 is fully released. If the disk 10 is turned clockwise, in the direction of the arrow B in Fig. 3, the pin 12 travels to the other end of the cam slot 13 and reaches the other end thereof just as the handle 11 comes into alinement with the slide 7. This travel of the pin 12 along the cam slot 13 draws the slide 7 rightwardly, pulling the ear 5 into engagement with the pin 2 to latch the camera back in closed position.

In order to accommodate the various manufacturing irregularities above mentioned, the pin 12 is not mounted rigidly on the disk 10 but is, on the contrary, mounted on a lever 14 which is pivoted to the disk 10 at one end, at 15, the other end 16 of the lever being constantly influenced by a hairpin shaped spring 17 wound on a stud 17$^a$, which spring tends to move the end 16 of the lever 14 in a counterclockwise direction about the pivot 15. This tends constantly to move the pin 12 in a direction closer to the center of the disk 10. Yet, by flexing the spring 17, the lever 14 can move in a clockwise direction on its pivot 15, and thus the pin 12 can move slightly farther away from the center of the disk 10, thus allowing the disk 10 to be swung fully to its normal latched position (with the handle 11 directly overlying and alined with the slide 7) even if manufacturing irregularities in the camera prevent the slide 7 from moving all the way to its rightward limit of travel.

The distance from the pin 12 to the pivot 15 of the lever 14 is considerably less than the distance from the pin 12 to the opposite end of the lever where it is acted upon by the spring 17. Thus there is a multiplication of the force of the spring, so that a comparative light spring will suffice to urge the pin 12 toward the center of the disk 10 with comparatively great force. The parts are so designed and proportioned that even when the slide 7 has moved all the way to the right hand end of its travel, the spring 17 is somewhat tensioned, and in this way the pin 12 exerts a resilient pulling action on the slide 7 whenever the latching mechanism is in latched or closed position, thus resiliently and strongly holding the ear 5 engaged with the pin 2 to keep the camera back or cover in fully latched or closed position, notwithstanding manufacturing irregularities. The cam slot 13 is provided with a slight recess or depression 18 at one end, into which the pin 12 seats itself when the handle 11 is moved to latching or closed position, so that the engagement of the pin in this recess 18 provides also a resilient detent or latch serving to hold the handle 11 in its closed position against accidental displacement toward opening position.

The hollow stud 8 is preferably internally threaded at 19 (Figs. 1 and 2) to receive a tripod screw.

It will be noticed from Fig. 2 that when the disk 10 and handle 11 are in the closed or latching position, the end of the handle 11 overlies the slide 7 and projects a little beyond the hinge 6, slightly overlying the pivoted part 4 of the slide. This constitutes an additional latch preventing the portion 4 from being swung upwardly on its hinge 6 whenever the handle 11 is in the latching position, although the member 4 cannot swing upwardly at this time for the additional reason that the pin 2 is engaged in the opening in the ear 5. When the handle 11 is swung to the unlatching position as in Fig. 3, then it no longer overlies the portion 4, and thus the portion 4, no longer being engaged with the pin 2 and no longer being blocked by the handle 11, can now be swung up in the direction of the arrow A in Fig. 2, to release the camera back 3 from the front wall 1, allowing the camera back to be opened up for loading and unloading the camera and allowing it to be, if desired, completely removed from the camera and replaced by a different back provided with a similar latching mechanism. Slight manufacturing differences in different camera backs will, with this latch mechanism, no longer be an obstacle to placing such different camera backs on the same camera body, for in all cases, in spite of slight irregularities or differences, the latch will serve to hold the particular camera back firmly and resiliently in fully closed position with respect to the camera body. The latch mechanism on every camera back is made of such size and proportions that there will be some stressing of the spring 17 during the latching or closing movement, with respect to any camera body with which the back is intended to be used, but the extent of stressing or displacement of the spring 17 can vary somewhat when the back is applied to one camera body or another, which might have slight differences in size within allowable manufacturing limits or tolerances.

Figure 4:
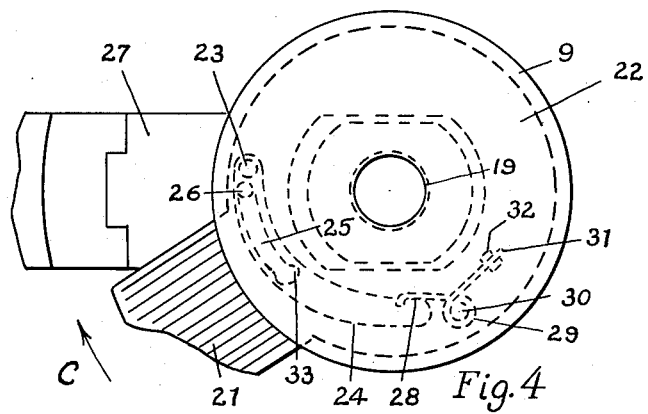
Fig. 4 is a view similar to Fig. 3 of a modified structure.

Referring now to Fig. 4, there is here shown an alternative construction in which the pin is mounted in fixed position rather than resiliently, and in which the cam slot itself is resilient rather than fixed. In other respects, the construction is the same as previously described. The slide member previously designated by the numeral 7 is here indicated (in Fig. 4) at 27, and the disk 10 is here indicated at 22, having an operating handle 21. In this alternative construction, the pin is shown at 26 and is rigidly mounted on the slide 27. The cam slot 25 which receives the pin is here formed in a lever 24 pivoted at 23 to the disk 22, the cam slot being formed near the pivoted end of the lever. The opposite end of the lever 24 is under the influence of one end 28 of the hairpin spring 29 wound on the stud 30 on the disk 22, the other end 31 of the spring being anchored by lugs 32 on the disk 22. The spring 29 constantly tends to move its end of the lever 24 closer toward the center of the disk 22, thus tending to swing the lever counterclockwise on its pivot 23. Hence when the disk 22 and its handle 21 are moved in the direction of the arrow C in Fig. 4, to latching position, the pin 26 on the slide 27 is drawn toward the center of the disk 22 by reason of the inclination of the cam slot 25, and at the end of the closing movement the spring 29 is stressed so as to produce a constant rightward pull on the pin 26 and slide 27. A recess or enlargement 33 at one end of the cam slot 25 is engaged by the pin 26 in the fully latched position of the parts, thus serving to latch the disk 22 and handle 21 resiliently in the closed position. In other respects, this alternative construction operates the same way as the construction first described.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a latch mechanism adapted for use on a photographic camera having a projecting catch pin on its front wall and a displaceable back wall, said mechanism embodying a mounting for attachment to the said back wall, a tongue slidable in the mounting in forward and rearward directions, a latch member hinged to the tongue to project forwardly and provided with a perforated lip adapted to swing vertically into and out of alinement with the catch pin on said front wall, an actuating spring on the mounting normally tending to retract the tongue and latch member and to hold the lip in resilient engagement with the catch pin, and operating means for slidably projecting the tongue and latch member to disengage the lip from the pin against the tension of said spring.

2. In a latch mechanism for a photographic camera in accordance with claim 1, in which said mounting is provided with a stud, said tongue embraces the stud and is provided with an eccentric cam slot, said operating means includes a member rotatable on said stud, and further including a lever pivoted on the operating member and carrying a pin engaging in the cam slot, and said actuating spring exerting pressure against the pin carrying portion of said lever.

3. In a latch mechanism for use on a photographic camera, said mechanism including a rotary member mounted on one of said parts, a latch member controlled by the rotary member for engaging the other of said parts, means forming a cam slot element on one of the members, a pin element on the other of said members engaging in said cam slot element, said cam slot element being so shaped that when said rotary member is turned, said pin element travels along said cam slot element to cause movement of said latch member, and a spring-influenced lever pivoted to one of said members and carrying one of said elements.

4. In a latch mechanism for use on a photographic camera having a body and a back movable with respect to said body, said mechanism including a slide member mounted on said back and having a first part movable longitudinally toward and away from an edge of said back and a second part projecting beyond said edge of said back and hinged to said first part to move longitudinally therewith and also to be swung to an angle relatively to said first part, an ear on said second part of said slide member for extending over said edge of said back and engaging a portion on said body, a rotary member mounted on said back for turning movement relative to a fixed axis of rotation thereon and having an operative connection with said slide member to draw the first part of said slide member longitudinally in a general direction away from said edge of said back to engage and tension said ear against said body when said rotary member is turned from a released position to a predetermined tensioned position, said operative connection between said rotary member and said slide member comprising a curved cam slot portion on one of said members arranged eccentrically with respect to said axis of rotation, a pin portion on the other of said members for engaging in said cam slot portion, and a resilient mounting on one of said members for mounting the one of said portions which is on said one of said members, so that said rotary member may turn all the way to said predetermined tensioned position even though said ear may become fully engaged with said body before said rotary member reaches its said predetermined tensioned position.

5. A construction as defined in claim 4, in which said rotary member has an approximately radial arm which overlies and is alined with said first part of said slide member when said rotary member is in its said predetermined tensioned position.

6. A construction as defined in claim 5, in which said radial arm also overlies a portion of said second part of said slide member when said rotary member is in its predetermined tensioned position, to prevent said second part from being swung to an angle relative to said first part.

7. A construction as defined in claim 4, in which said resilient mounting includes a lever pivoted to said rotary member at one end, and carrying between its ends the one of said portions which is mounted on said rotary member, and a spring mounted on said rotary member and engaging the other end of said lever.

References Cited in the file of this patent

FOREIGN PATENTS 154,739    Great Britain  ------------ Dec. 9, 1920